United States Patent

Janik

[11] Patent Number: 5,837,137
[45] Date of Patent: Nov. 17, 1998

[54] BASE/CARTRIDGE LOCATION AND KEY SYSTEM FOR FUEL FILTER ASSEMBLY

[75] Inventor: Leon P. Janik, Suffield, Conn.

[73] Assignee: Stanadyne Automotive Corp., Windsor, Conn.

[21] Appl. No.: 700,792

[22] Filed: Aug. 21, 1996

[51] Int. Cl.⁶ .................................................. B01D 35/30
[52] U.S. Cl. .......................... 210/232; 210/438; 210/440; 210/444
[58] Field of Search .................................... 210/232, 438, 210/440, 443, 444, 447

[56] References Cited

U.S. PATENT DOCUMENTS 2,630,919  3/1953  Tyler ........................................ 210/233
5,186,829  2/1993  Janik ........................................ 210/232
5,203,994  4/1993  Janik ........................................ 210/232

Primary Examiner—Matthew O. Savage
Attorney, Agent, or Firm—Alix, Yale & Ristas, LLP

[57] ABSTRACT

A locating and keying system for a filter system assembly employs protrusions having a selected location and shape, such as a spherical sector cap, a pie wedge, a square or a bead, which longitudinally protrude from the end receiving surface of the base. Corresponding dimples in the opposing surface of the cartridge are dimensioned for receiving the protrusion for locking the cartridge at a fixed angular position of the base.

19 Claims, 8 Drawing Sheets

BASE/CARTRIDGE LOCATION AND KEY SYSTEM FOR FUEL FILTER ASSEMBLY

BACKGROUND OF THE INVENTION

This invention relates generally to fuel filters employed in connection with internal combustion engines. More particularly, the present invention relates to fuel filters and lubricating oil filters having a replaceable cartridge for removing foreign particles and/or separating water from the fuel supply or oil system of an internal combustion engine.

Conventionally, fuel filters employ a disposable filter cartridge which is replaced at pre-established intervals of filter usage. In practice, the filter cartridge requirements may vary depending upon such characteristics as the type and make of the internal combustion engine, the specific application for which the engine is employed, the climate in which the combustion engine is operated, and/or regional characteristics as to the quality of the fuel supply. The filter cartridges which are suitable for replacement, thus commonly vary as to axial dimensions, capacity and filter media qualities.

One of the recurring problems in assuring quality fuel filter performance is encountered in connection with the replacement of the fuel cartridge. It is imperative that the replacement cartridge be compatible with the filtering requirements for the fuel system. Because for numerous types of qualities, the filter cartridge may dimensionally conform to the base of a given fuel filter assembly, replacement filter cartridges of inferior quality may not comply with the applicable specifications for a given fuel filter assembly and thereby jeopardize the integrity of the fuel filtering system. The replacement with an incompatible filter cartridge can have very serious consequences for the operation of the internal combustion engine and may also be unnecessarily more expensive than the less costly cartridges which are fully suitable. In practice, the owner of the vehicle and/or the maintenance technician servicing the internal combustion engine are frequently totally unaware of replacement cartridge specifications and requirements and unknowingly jeopardize the integrity of the filtering system by replacement with a wholly unsuitable cartridge even though the unsuitable cartridge at least cursorily visibly appears to be suitable. There are also, of course, instances where inferior or improper replacement filter cartridges are intentionally installed without the knowledge of the owner of the operator of the vehicle.

For many applications, it is also desirable that a cartridge be mounted to the base at a specific angular orientation so that warnings, directions and markings affixed to the cartridge may be properly positioned to ensure visibility and maximize the chances of successful information dissemination. For other applications, it is desirable that the cartridge be locked in position relative to the base such that the cartridge may not rotate with relation to the base.

SUMMARY OF THE INVENTION

Briefly stated, the invention in a preferred form is a location and key system for locating and keying a replaceable filter cartridge to the filter base.

The filter system is of a type having a base with an inlet and an outlet connection with the engine fuel system and a replaceable filter cartridge mountable to the base. The replaceable cartridge includes a generally cylindrical housing which houses the fuel filter elements. At least one key or protrusion protrudes longitudinally from the bottom surface of the base. A corresponding dimple in the cartridge is dimensioned and located on the top surface of the cartridge for receiving each corresponding protrusion for locking the cartridge at a fixed angular position of the base.

A unique matrix of longitudinally protruding protrusions is formed on each base of a given type, and a unique matrix of dimples corresponding to the protrusions is formed in each cartridge. The protrusion/dimple matrices are configured so that for a given compatible cartridge and base, the protrusions are interlockable in the dimples to lock the cartridge at a fixed angular position of the base to thereby permit the cartridge to be securely mounted to the base. For non-compatible cartridges and bases, the base protrusions are not mateable and essentially interfere with the mounting and sealing of the non-compatible cartridge so that compatible and non-compatible cartridges may be readily identified.

An object of the invention is to provide a new and improved location and key system for a fuel filter system.

Another object of the invention is to provide a new and improved replacement cartridge location and key system for efficiently controlling the replacement of the filter cartridge with a compatible replacement cartridge.

A further object of the invention is to provide a new and improved location and key system wherein the cartridge is mounted to the base in a pre-established fixed angular orientation.

A yet further object of the invention is to provide a new and improved location and key system for locking the cartridge to the base and thereby preventing rotation therebetween.

Other objects and advantages of the invention will become apparent from the drawings and specification.

BRIEF DESCRIPTION OF THE DRAWING

The present invention may be better understood and its numerous objects and advantages will become apparent to those skilled in the art by reference to the accompanying drawing in which.

DETAILED DESCRIPTION OF THE PREFERRED EMBODIMENT

Figure 1:
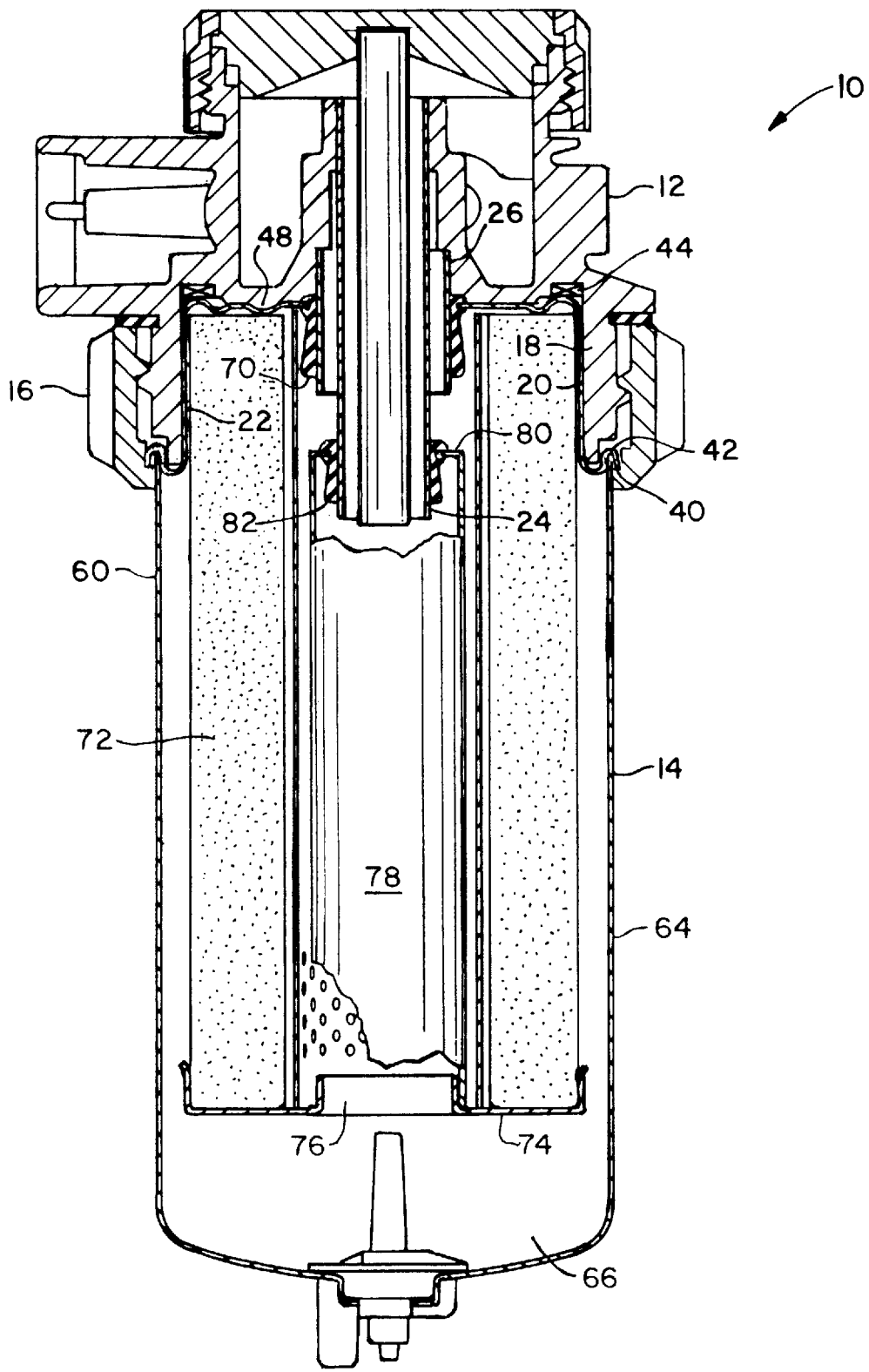
FIG. 1 is a sectional elevational view of a fuel filter assembly in accordance with the invention.

With reference to the drawings wherein like numerals represent like parts throughout the several figures, a fuel filter assembly in accordance with the present invention is generally designated by the numeral 10. Fuel filter assembly 10 comprises a base 12 and a disposable filter cartridge 14.

The base 12 is disposed generally above the disposable filter cartridge 14 which is locked to the base 12 by means of a retainer collar 16. Alternatively, the base and filter cartridge may be inverted wherein the filter cartridge is disposed above the base. The fuel filter assembly 10 is especially adapted for incorporation into the fuel supply system of an internal combustion engine (not illustrated), such as a diesel engine, for removing particulate matter from fuel and separating the water from the fuel. Filters of this type may also be used to filter impurities from oil in the lubricating system of an internal combustion engine.

The base 12 and the disposable cartridge 14 may assume a wide variety of configurations. For the disclosed embodiment, the base 12 is an inverted cup-like receptacle which forms a skirt 18 defining a lower receptacle cavity 20 for upper portions 22 of the disposable cartridge 14. An elongated sleeve-like first conduit 24 and an outer concentric sleeve-like second conduit 26 provide generally co-axial fluid communication between the base 12 and the disposable cartridge 14.

Figure 6:
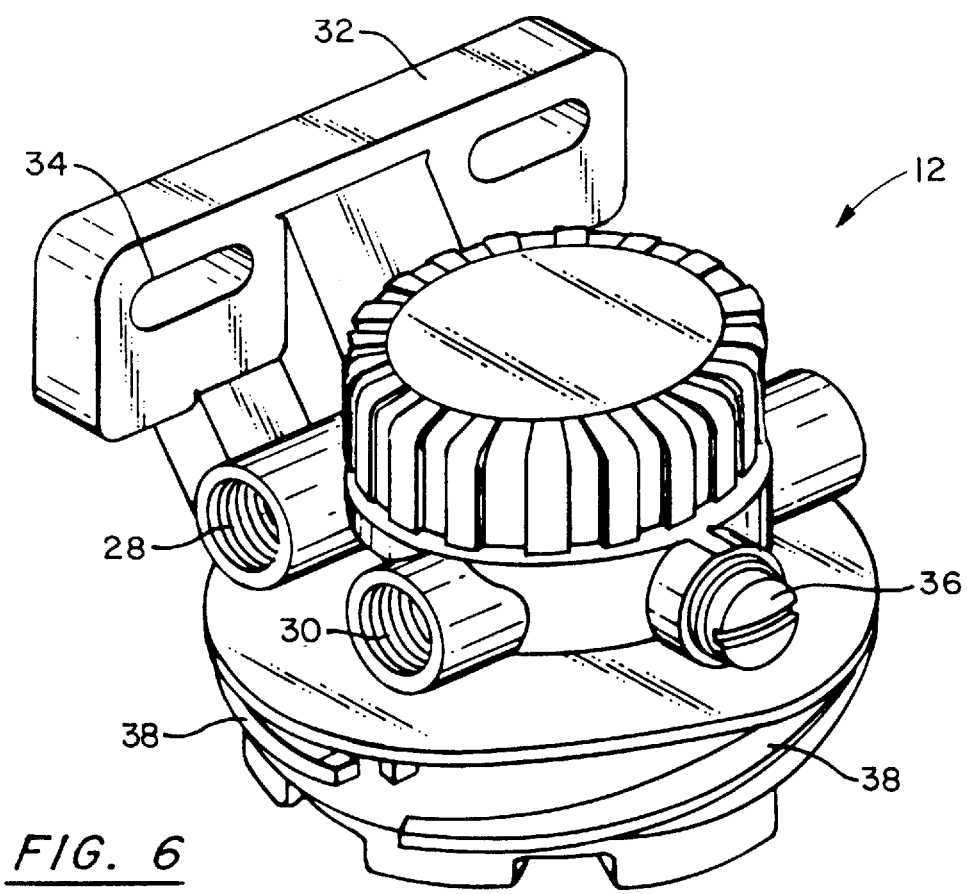
FIG. 6 is an enlarged perspective view of the base portion of the fuel filter assembly of FIG. 1.
Figure 7A:
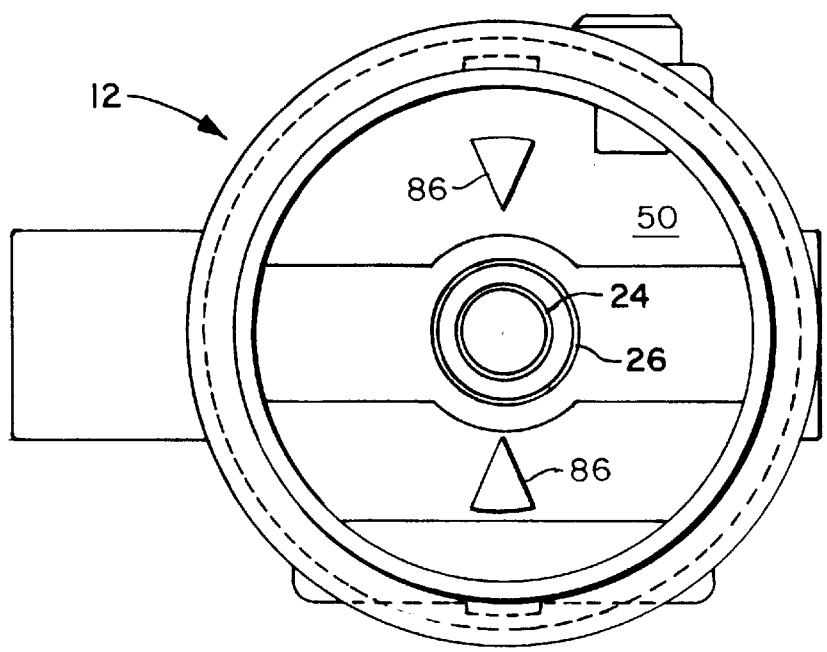
FIGS. 7a, 7b and 7c are enlarged bottom plan views of the base portion of the fuel filter assembly of FIG. 1 showing alternate embodiments of the protrusions.
Figure 7B:
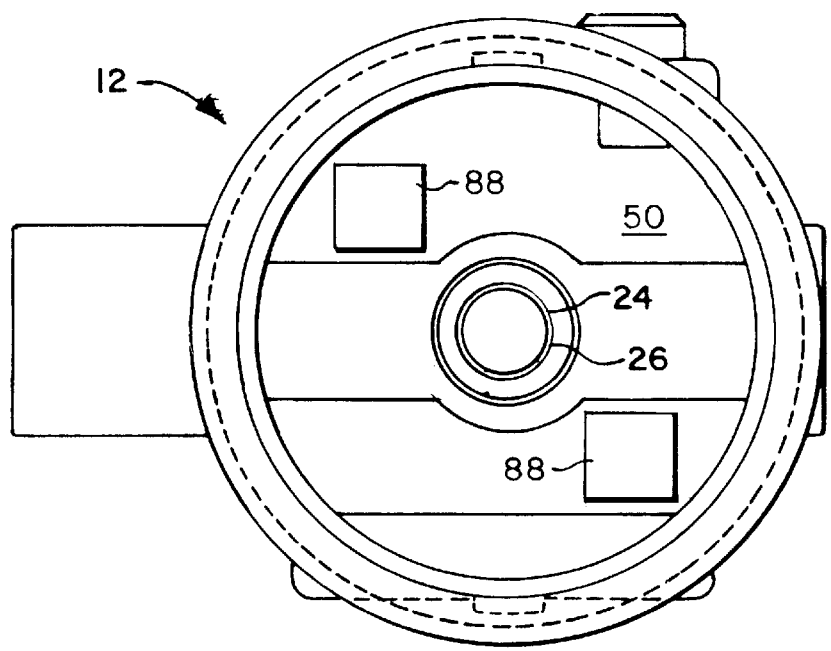
Figure 7C:
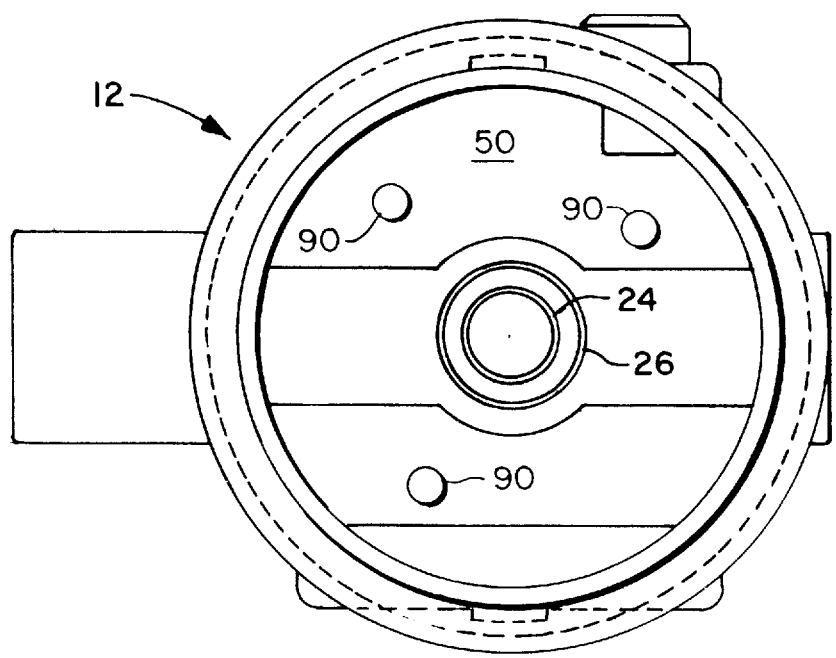

With reference to FIG. 6, an inlet connector 28 at an upper side location of the base 12 connects with the fuel line (not illustrated) to ultimately provide fluid communication through the interior passageway defined by the first conduit 24. An outlet connector 30 at an upper side location of the base 12 connects with the fuel line to provide external fluid communication from the axial fluid conduit defined between the first and second conduits 24, 26. An integral projecting bracket 32 which may include a pair of openings 34 for anchoring the filter base 12 to the engine header extends transversely from the base 12. The base 12 may also have an external air vent 36.

The base 12 may include a pair of integral outwardly projecting diametrically opposed ramps 38 which ascend in spiral-like fashion around the base 12. The upper ends of the ramps 38 are beveled. The collar 16 includes a pair of diametrically disposed spiral followers (not shown) which integrally extend inwardly from the collar 16. The followers are dimensioned and positioned for engagement with the ramps 38 so that the followers slidably engage and ascend the ramps 38 upon alignment and angular rotation of the collar 16. The collar 16 includes an inwardly projecting annular shoulder 40 which engages the roll seam 42 of the cartridge 14 for releasably locking the cartridge 14 to the base 12.

Figure 2:
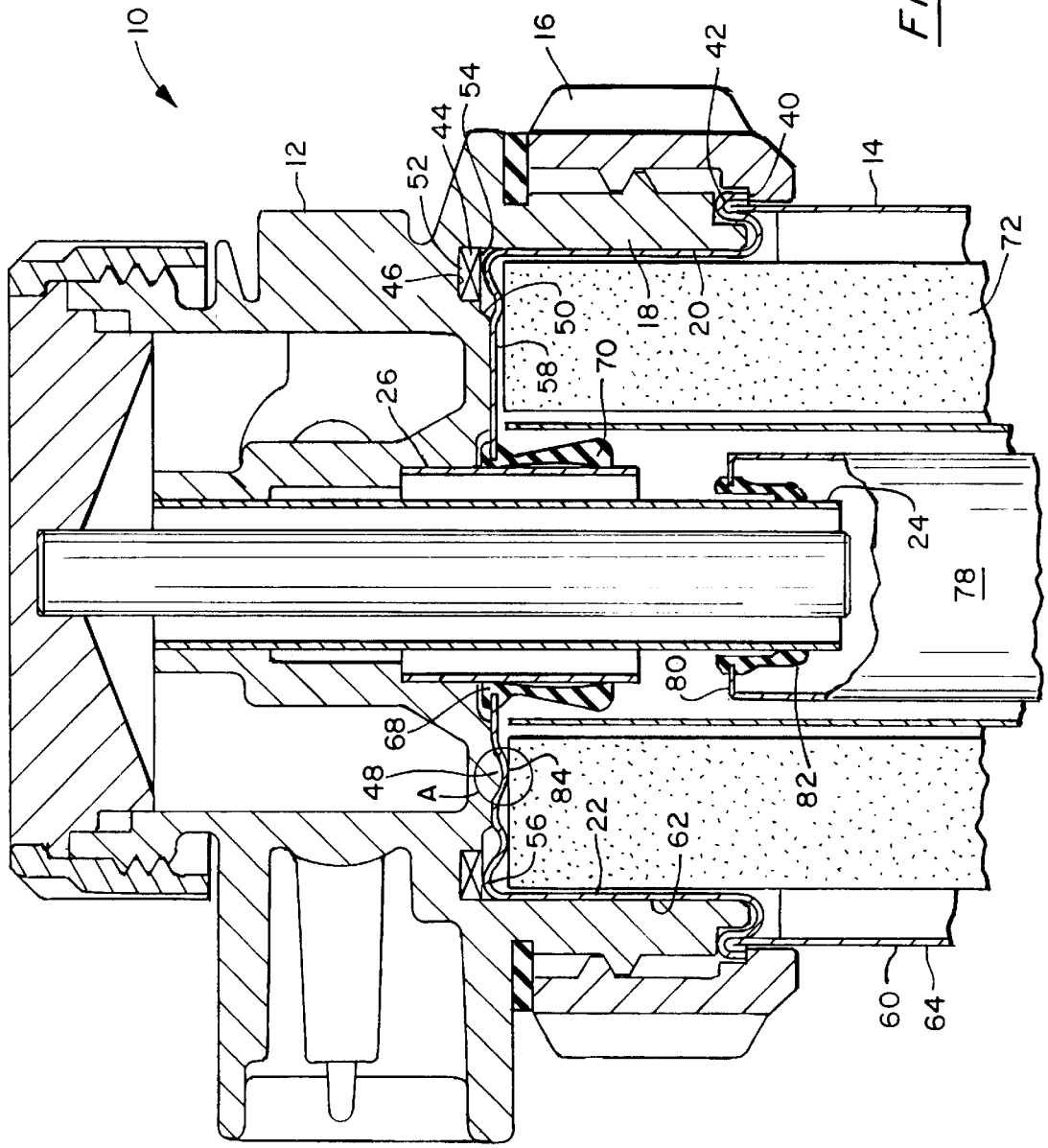
FIG. 2 is an enlarged fragmentary sectional view, partly in schematic, of the fuel filter assembly of FIG. 1.
Figure 3:
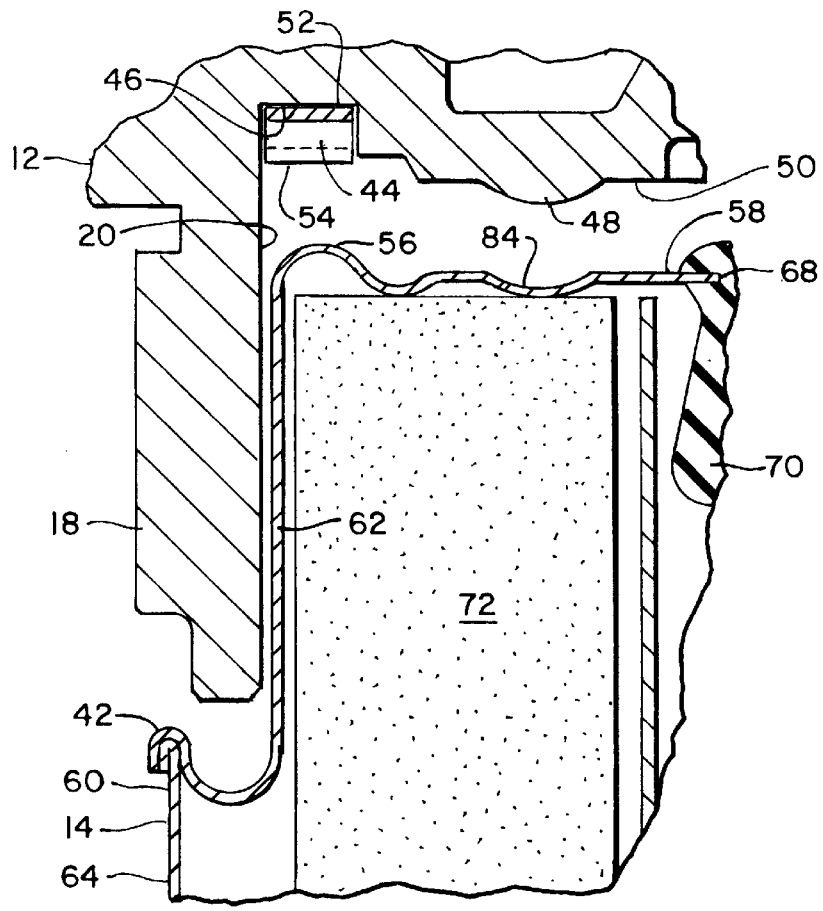
FIG. 3 is an enlarged fragmentary sectional view of the filter base and filter cartridge of FIG. 1 showing the filter cartridge partly disassembled from the filter base.

With reference to FIGS. 1 and 2, a locking force is releasably maintained by the force of a spring 44 which is retained in an annular recess 46 in the base 12. The recess 46 is positioned adjacent the skirt 18 of the base 12. Some conventional filter assemblies include a spring for providing a locking force. Typically, such springs are positioned closer to the axis of the filter base/cartridge than the spring 44 of the subject invention. Springs 44 located closer to the periphery of the filter base/cartridge may provide greater stability than do springs located closer to the axis. In addition such location allows room for key/locating protrusions 48, 86, 88, 90 (FIGS. 5, 7a–7c) that protrude downwardly from the lower receiving surface 50 of the base 12. A preferred embodiment is a wave spring having an upper surface 52 that abuts the surface of the recess 46 and a lower surface 54 that engages an annular ridge 56 on top portion 58 of the upper section 62 of the filter cartridge enclosure 60. The spring 44 functions to substantially uniformly distribute the load between the base 12 and the filter cartridge 14.

Figure 4:
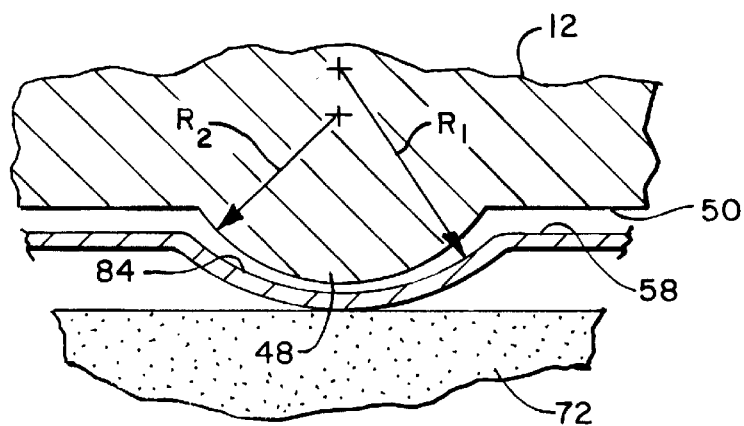
FIG. 4 is an enlarged sectional view of Area A of the fuel filter assembly of FIG. 2.
Figure 5:
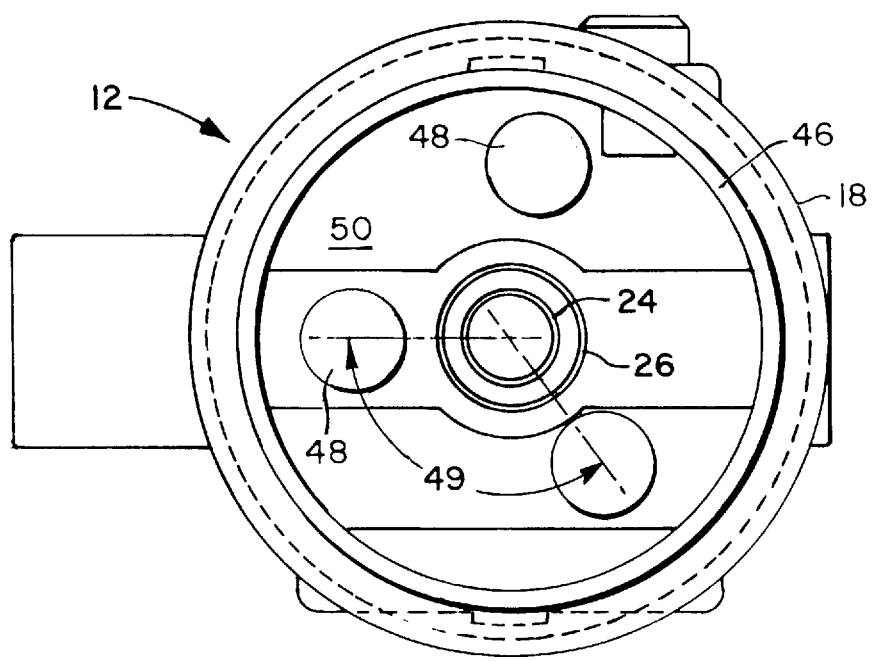
FIG. 5 is an enlarged bottom plan view of the base portion of the fuel filter assembly of FIG. 1.

A key system is employed to angularly fix the direction of the cartridge 14 relative to the base 12, to provide a system wherein only a proper replacement cartridge 14 may replace the cartridge once the installed cartridge is spent, and to lock the cartridge 14 to the base 12 and thereby prevent rotation therebetween. In a preferred form, a plurality of longitudinally extending keys or protrusions 48, 86, 88, 90 (FIGS. 5, 7a–7c) protrude from the bottom surface 50 of the base 12 intermediate the recess 46 and the second conduit 26. Preferably, the protrusions 48, 86, 88, 90 are disposed substantially equidistantly between the second conduit 26 and the recess 46. The protrusions 48, 86, 88, 90 are selectively dimensioned and positioned to provide a unique protrusion matrix for a given filter capacity, filtering quality or filtering parameter. The protrusions may have the shape of a spherical sector cap 48, a pie wedge-shape 86, a square-shape 88, a bead or bump 90, or other non-spherical shape, as shown in FIGS. 4, 5 and 7a–7c. Preferably, the protrusions 48, 86, 88, 90 project at least 0.150 inches from the lower surface 50 of the base 12. For filter assemblies 10 which require a positioning and/or locking system but that do not require a key system, the protrusions 48, 86, 88, 90 may be spaced substantially 120° apart, as shown in FIG. 5 at 49.

With reference to FIGS. 1 and 2, the disposable filter cartridge 14 comprises a can-like enclosure 60 formed by a pair of opposed lower and upper cup-like sections 64, 62. The sections 62, 64 are joined along a circumferential roll seam 42. A sump 66 is formed at the bottom of the lower section 64 to collect water which coalesces from the fuel. The upper section 62, which is smaller in diameter than the lower section 64, is received by the base receptacle 20. The upper section 62 is dimensioned to be closely accommodated in the base receptacle 20. A central axial opening 68 in the upper section 62 is dimensioned to receive the conduits 24, 26. A sealing grommet 70 mounted at the opening 68 diametrally fluidically seals against the outer conduit 26.

The cartridge 14 may employ a dual stage filter assembly or a single stage assembly as illustrated in FIGS. 1 and 2. A filter element 72 which has a continuous fan-shaped pleated configuration is mounted in the enclosure 60. The lower end of the element 72 is engaged by a medial plate 74 having a central opening 76. A tubular conduit 78 extends upward from the medial plate 74. The tubular conduit 78 upper end defines a flange 80. A second sealing grommet 82 mounted to the flange 80 receives and diametrally seals against the lower end of the base first conduit 24.

The top portion 58 of the upper section 62 of the filter cartridge enclosure 60 has a longitudinally upward bend configuration which forms the annular ridge 56. Preferably, the ridge 56 is disposed along the circumference of the top portion 58. The top portion 58 further comprises a plurality of integrally formed dimples 84 disposed intermediate the annular ridge 56 and the central opening 68. The dimples 84 are relatively shallow depressions. The dimples 84 are complementary with the protrusions 48, 86, 88, 90 and are dimensioned and positioned for receiving the protrusions 48, 86, 88, 90. In a preferred embodiment, the protrusions 48, 86, 88, 90 are machined to ensure that the protrusions 48, 86, 88, 90 may be firmly seated in the dimples 84. In a preferred embodiment for the spherical sector cap protrusion 48, the radius R1 of each dimple 84 is greater than the radius R2 of each protrusion 48, (as shown in FIG. 4) to ensure that each protrusion 48 may be firmly seated in the corresponding dimple 84.

Figure 8:
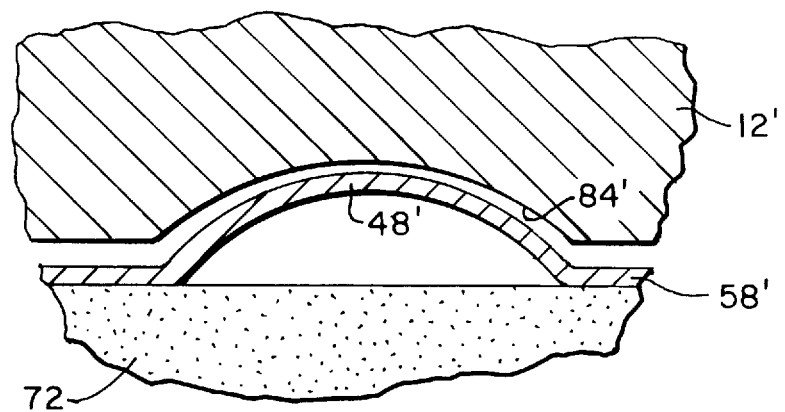
FIG. 8 is an enlarged sectional view of Area A of an alternate embodiment of the fuel filter assembly of FIG. 2.

It should be appreciated that the invention could also be implemented, perhaps less easily, if the top portion 58' comprised a unique protrusion matrix 48 and the base 12' comprised complementary dimple 84' (FIG. 8). It should also be appreciated that the location and key system of the subject invention prevents rotation of the filter cartridge 14 relative to the filter base 12 due to vibration.

The fuel enters the fuel filter assembly 10 through the fuel inlet passage 28 and exits the filter through the outlet passage 30. It will be appreciated that the fuel flow path initially axially traverses through the interior of the inner conduit 24. The circulation path extends generally axially upwardly and generally radially through the filter element 72 with the return flow path traversing between the inner conduit 24 and the outer conduit 26.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter system comprising:
    a base comprising an inlet, an outlet, a central axis, first axial conduit means coaxially surrounding said central axis for communicating with said inlet, second axial conduit means coaxially surrounding said first axial conduit for communicating with said outlet, a skirt coaxially surrounding said second axial conduit means, an annular surface extending generally radially from said second axial conduit means to said skirt, said skirt and said annular surface and said second axial conduit means together defining a cavity, wherein said annular surface defines an engagement surface positioned within said cavity, wherein a plane coextensive with said engagement surface intersects said second axial conduit means, and protrusion means comprising at least one protrusion protruding axially outwardly from said engagement surface; and
    cartridge means mountable to said base for defining a flow path communicable with said inlet and said outlet, said cartridge means comprising filter means for filtering fluid passing through said cartridge means and enclosure means for enclosing said filter means, said enclosure means comprising an end portion disposed within said cavity, said end portion comprising an axial opening for receiving said first and second axial conduit means, said end portion further including receptacle means for receiving said protrusion, said receptacle means being dimensioned and located for longitudinally receiving a corresponding said protrusion, said receptacle means being engageable with said protrusion for locking said cartridge means at a fixed angular position of said base.

2. The filter system of claim 1 wherein said annular surface comprises an annular recess and said filter system further comprises spring means at least partially disposed in said recess and engageable with said end portion for biasing said cartridge means away from said base.

3. The filter system of claim 2 wherein said protrusion means comprises a plurality of protrusions generally equidistantly spaced from said second conduit and said recess.

4. The filter system of claim 1 wherein said receptacle means comprises a dimple having a radius R1 and said protrusion has a radius R2, wherein R1>R2.

5. The filter system of claim 1 wherein said end portion further comprises a longitudinally extending annular ridge.

6. The filter system of claim 5 wherein said ridge is disposed at the circumference of said end portion.

7. The filter system of claim 6 wherein said engagement surface comprises an annular recess and said filter system further comprises spring means at least partially disposed in said recess and engageable with said ridge for biasing said cartridge means away from said base.

8. A filter system comprising:
    a cup-shaped base defining an axis and comprising an inlet, an outlet, first axial conduit means coaxially surrounding said axis for communicating with said inlet, second axial conduit means coaxially surrounding said first axial conduit for communicating with said outlet, a skirt coaxially surrounding said second conduit means, an annular surface extending radially from said second axial conduit means to said skirt, said skirt and said bottom surface and said second axial conduit means together and defining a cavity, and wherein said bottom surface defines an interior surface located within said cavity and extending substantially along a plane perpendicular to said axis wherein a plane coextensive with said interior surface intersects said second axial conduit means;
    cartridge means mountable to said base comprising a generally cylindrical enclosure means for enclosing filter means for filtering fluid passing through said cartridge means and defining a flow path communicable with said inlet and said outlet via said first and second conduit means, said enclosure means having an end portion extending axially of said axis and being disposed within said skirt;
    key means comprising at least one key axially protruding from one of said interior surface of said base or said end portion of said cartridge means;
    receptacle means for defining at least one receptacle in the other of said interior surface of said base or said end portion of said cartridge means, each said receptacle being dimensioned and located for receiving a corresponding key for locking said cartridge means at a fixed angular position of said base; and
    retaining means engageable with said cartridge means and said base for retaining said cartridge means to said base.

9. The filter system of claim 8 wherein said annular surface comprises an annular recess and said filter system further comprises spring means at least partially disposed in said recess and engageable with said cartridge means for biasing said cartridge means away from said base.

10. The filter system of claim 8 wherein said end portion comprises a longitudinally extending annular ridge.

11. The filter system of claim 10 wherein said end portion further comprises said receptacle means, said receptacle means being disposed intermediate said ridge and said second conduit.

12. The filter system of claim 8 wherein said key means comprises three keys, each of said keys having a center, wherein the plane defined by a center of each key and the axis of the base is substantially 120° from a plane defined by the center of each adjacent key and the axis of the base.

13. The filter system of claim 8 wherein each key has the shape of a spherical sector cap.

14. The filter system of claim 8 wherein each key has the shape of a pie wedge.

15. The filter system of claim 8 wherein each key has the shape of a square.

16. The filter system of claim 8 wherein each key comprises a bead.

17. A filter cartridge for mounting to a base to form a filter assembly, the base defining an axis and including an interior receiving surface located substantially along a plane perpendicular to the axis and at least one key axially protruding from the receiving surface of the base, the cartridge comprising:

filter means for filtering a flow of liquid, said filter means comprising at least one filter element;

enclosure means for enclosing said filter means, said enclosure means comprising opposing first and second shell sections, said sections being generally symmetric about a central axis and being joined together, said second section defining an axial opening and comprising an end portion having an end surface axially spaced apart from said first section, wherein said second section extends axially from said end portion to said first section;

receptacle means disposed at said end surface for defining at least one receptacle, each said receptacle having an axis of symmetry that is radially offset from said central axis and being dimensioned and located for receiving a corresponding key of the base for locking said cartridge at a fixed angular position of said base.

18. The filter cartridge of claim 17 wherein said end surface comprises an axially protruding annular ridge.

19. The filter cartridge of claim 18 wherein said receptacle means is disposed intermediate said ridge and said axial opening.

\* \* \* \* \*